Dec. 9, 1924. 1,518,162

T. PARKINSON

COOLING ROOM FOR HOSPITALS

Filed April 14, 1922

INVENTOR
Thomas Parkinson.
BY
ATTORNEY

Patented Dec. 9, 1924.

1,518,162

UNITED STATES PATENT OFFICE.

THOMAS PARKINSON, OF TOPEKA, KANSAS.

COOLING ROOM FOR HOSPITALS.

Application filed April 14, 1922. Serial No. 552,736.

*To all whom it may concern:*

Be it known that I, THOMAS PARKINSON, a citizen of the United States, residing at Topeka, in the county of Shawnee and State of Kansas, have invented certain new and useful Improvements in Cooling Rooms for Hospitals; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to cooling rooms for hospitals and the like and it is particularly designed for general therapeutic treatment of patients although it is more particularly applicable for use in the treatment of hay fever.

I am aware that cooling rooms have been provided in hospitals for the treatment of typhoid but the temperatures are maintained relatively high and the method followed out for the treatment of typhoid is not applicable for the treatment of hay fever because in hay fever it is desired to maintain the temperatures relatively low; for example, from zero F., to 32 degrees F., whereas in the treatment of typhoid, very much higher temperatures are employed.

The mechanism for maintaining the temperature in the room at the desired degree, the method of distribution, and the method of control of the various fluids and temperatures will be all described hereinafter, reference being had to the accompanying drawings, in which—

Figure 1:
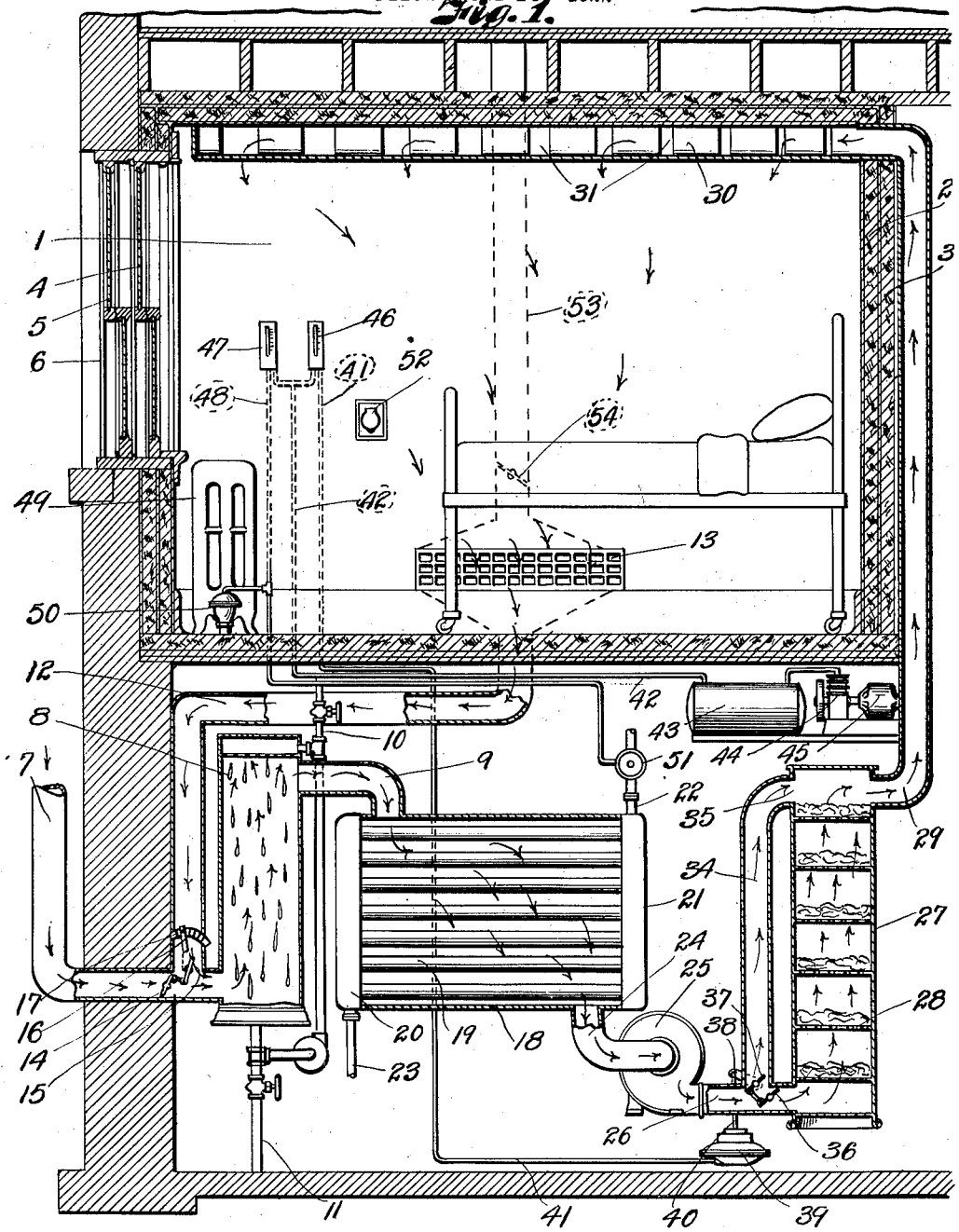
Figure 2:
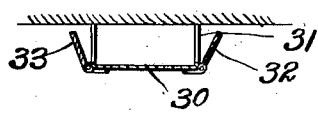

Fig. 1 is a diagrammatic view of a room constructed in accordance with my invention and the necessary appurtenances for carrying out the object of the invention, and Fig. 2 is a cross section through an air conduit at the top of the room and the louvers for controlling the effective port areas of the openings therein.

The room 1 may be of suitable proportions and I prefer to insulate the same with a double thickness of cork or some other suitable insulating material, the cork being diagrammatically indicated at 2 and 3 and I prefer to provide double windows 4 and 5 in a suitable window frame 6, as will be well understood.

The air to be introduced into the room may be conveyed from atmosphere through a pipe 7, the pipe preferably extending high enough into the air to insure purity. The pipe 7 communicates with the lower end of an air washer 8, which is shown as a cylinder and the air washer has at its upper end a discharge pipe or port 9. The air washer is supplied with water from a pipe 10 at its upper end, which may be flowed in a contra-direction to the air and discharged through the pipe 11 to a sewer. The pipe 12 communicates the register 13 with the pipe 7 slightly in advance of the air washer 8. Communication between the pipe 7 and the air washer or between the pipe 12 and the air washer can be controlled by valves 14 and 15 which simultaneously move in response to a lever 16 adapted to be held in any position by means of the segment 17. Therefore the air discharged from the room can be repassed through the system to the exclusion of atmospheric air by closing the valve 14 and opening the valve 15 so that the air passing from the register 13 will pass down through pipe 12, back into the air washer through the system into the room through an air conduit to be hereinafter referred to or the valves 14 and 15 can be partially opened so that a divided flow of fresh air and air from pipe 12 may enter the air washer.

The air passing through the air washer 8 is discharged into a refrigerator or air cooling devices, shown as comprising a casing 18 in which is a plurality of refrigerant pipes 19 connected to the headers or manifolds 20 and 21, the header or manifold 21 receiving the refrigerant from a pipe 22 and the manifold 20 discharging through a pipe 23. The air passes around the pipes 19 in the casing 18 and discharges through the pipe 24 to an air mover, shown as comprising a rotary pump 25, which may be driven by any appropriate means and which discharges into an outlet pipe 26, communicating at the bottom of the vertical casing 27 of a dehydrater provided with shelves 28, having suitable dehydrating material thereon, the shelves being of perforate material so that the air may pass through them and through the dehydrating substance into the discharge pipe 29, which communicates with an air conduit 30 suspended from the ceiling.

The air conduit 30 is in the form of a channel having openings 31 in its side walls of progressively increasing areas for the reason that there will be a progressive drop in pressure from the entrance of the conduit 30 to its discharge so the ports are made progressively larger toward the discharge so that a uniform volume of air may pass from the conduit and thereby insure a uniform distribution of the cooling fluid and maintain a uniform temperature in all parts of the room.

The effective port areas of the openings 31 may be controlled by hinged louvers 32 and 33 on opposite sides of the conduit 30 Fig. 2. These may be operated in any appropriate manner, their upper edges being adjacent to the ceiling so that the discharged air from the conduit 30 will be distributed against the ceiling so that the ceiling will form a deflector to divert the air laterally and to more efficiently distribute it within the room.

It is not essential in all cases for the proper humidity that the air pass through the dehydrater and for this reason I have provided a by-pass pipe 34, which communicates with the discharge pipe 26 at its lower end and by-passes the dehydrater and discharges into the pipe 29 at its upper end, as indicated at 35.

The distribution of the air from the pipe 26 can be controlled by the valves 36 and 37, the former controlling the effective port area of the inlet for the dehydrater and the latter the effective port area of the pipe 24 with respect to the pipe 36.

The movements of the valves are such that when one moves to open position, the other moves to closing position and vice versa, and these valves are controlled by a crank or lever 38, connected to a motor consisting of a casing 39 in which is a pressure diaphragm, (not shown) which supports a stem 40 connected to the lever 38. The diaphragm is so mounted that the normal tendency of the motor will be to cause open communication between the dehydrater and the pipe 26 but when pressure is applied to the diaphragm, the valve 36 will close off this communication and open communication between the pipe 26 and the pipe 34.

The motor receives its impulse air through a pipe 41, which is adapted to communicate with the pipe 42, receiving air from a storage tank 43, supplied by an air compressor 44 driven by a motor 45.

The communication between the pipes 41 and 42, however, is controlled by a hydrostat 46 of appropriate construction, the hydrostat constituting the connection between the pipes 41 and 42. Therefore, if the air washed has too much humidity, as it is estimated that it normally will, it will pass through the dehydrater in the normal operation of the system and enter the room in a relatively dry state with the proper amount of humidity. If, however, the room becomes too dry, that is, too little humidity, the hydrostat will open communication between the pipes 41 and 42 and cause the motor 39 to operate the valves 36 and 37 so that the communication will be cut off at least in part between the pipe 36 and the dehydrater and some or all of the air, depending upon the condition of the room, will pass through the pipe 34 into the pipe 29.

If the temperature in the room rises too high, a thermostat 47 will respond. The thermostat controls a valve which effects communication between a pipe 48 and the pipe 42 so that air may pass from the storage tank 43, through pipe 42 to pipe 48 and close off the heating fluid from a radiator 49, the control being through a pressure valve 50, which is normally open and which will close when communication is established between the pipes 48 and 42. The pipe 48 also communicates with a similar valve 51 in the pipe 22, which supplies the refrigerant to the header or manifold 21 and while the valve 51 is normally cracked or open, when the temperature is too high in the room 1, the valve will move in response to pressure and additional refrigerant will be admitted to the header 21 to pass through the pipe 19 to reduce the temperature of the air passing through it and through the dehydrater, the pipe 29, and to discharge through the openings in the conduit 30. Therefore, the temperature of the room will be reduced.

When the proper temperature is reached for which the thermostat has been set, communication will be closed off between the pipe 48 and the pipe 42 and, consequently, the valves 50 and 51 will function in their usual way.

It is apparent that a thermostatic control indicated at 47 may be purchased on the open market to cause communication to be established between the pipes 42 and 48, at any point between two extremes and likewise an appropriate hydrostat can be installed so I have not described these in detail as their constructions are well known and they are easily accessible.

At 52 I have indicated an electric connection in the form of a socket to which may be introduced the plug of an ozonator, that is, a well known form of electrical device which generates its own ozone, which may be discharged into the room.

It will be apparent from the foregoing that a room constructed in accordance with my invention may have a wide range of usefulness for therapeutic application and while I do not wish to limit myself to any special temperature, I prefer to maintain the temperatures relatively low in the case of hay fever because I have found in actual practice that a low temperature in a room in which a patient is located is very effective in relieving the distressing symptoms of this disease.

What I claim and desire to secure by Letters-Patent is:

1. The combination with an air supply, an air washer in series therewith, an air cooler in series with the air washer, a dehydrater in series with the air cooler, an air impeller between the air cooler and the dehydrater, means for distributing the air from the dehydrater to a room, means for by-passing air from the impeller around the dehydrater, and a hydrostatically controlled means for rendering the last named means effective and ineffective.

2. The combination with an air supply, an air washer in series therewith, an air cooler in series with the air washer, a dehydrater in series with the air cooler, an air impeller between the air cooler and the dehydrater, means for distributing the air from the dehydrater to a room, means for by-passing air from the impeller around the dehydrater, a hydrostatically controlled means for rendering the last named means effective and ineffective, means for controlling the temperature of the cooler, and a thermostat for operating the last named means.

3. In combination with a cooling room, a distributor comprising a conduit at the top thereof having discharge openings of progressively increasing port areas, means for controlling air admitted to said conduit comprising an air source, an air washer, an air cooler and a dehydrater connected in series in the order named and discharging into the conduit, an impeller pump between the dehydrater and the cooling means, a by-pass for the dehydrater communicating with the discharge end of the impeller pump and discharging into the conduit, valves for alternately opening and closing the inlet to the by-pass and the inlet to the dehydrater with the discharge end of the pump, and a hydrostat having its sensitive element in the cooling room and effective for operating the valves in response to the hydrostatic variations in the room.

4. In combination with a cooling room, an air inlet, a washer in series therewith, a refrigerating means in series with the air washer, a dehydrator, a pump connecting the refrigerating means with the dehydrator, a conduit leading from the dehydrater and discharging into the top of the room, a conduit leading from the room and discharging into the air inlet, a valve for closing off communication between the last-named conduit and the air inlet, a by-pass conduit connected to the discharge end of the pump and by-passing the dehydrator into the first-named conduit, a valve for controlling the effective port area of the by-pass, and thermostatically controlled means located in the room for operating said valve.

In testimony whereof I affix my signature.

THOMAS PARKINSON.